United States Patent [19]

Whitten et al.

[11] Patent Number: 5,007,496

[45] Date of Patent: Apr. 16, 1991

[54] AUTOMATED UNDERGROUND HAULAGE TRUCK

[75] Inventors: Brian T. Whitten; Pierre Veraart; Andrew Kwasniewski; Kurt Vollenwyder, all of Kingston, Canada

[73] Assignee: Inco Limited, Toronto, Canada

[21] Appl. No.: 466,867

[22] Filed: Jan. 18, 1990

Related U.S. Application Data

[63] Continuation of Ser. No. 189,040, May 2, 1988, abandoned.

[51] Int. Cl.⁵ ............................................. E01B 25/28
[52] U.S. Cl. ..................................... 180/131; 104/93
[58] Field of Search .................... 180/79.1, 131, 167, 180/168; 104/88, 242, 244.1, 93

[56] References Cited

U.S. PATENT DOCUMENTS

| | | | |
|---|---|---|---|
| 4,078,630 | 3/1978 | Krieg | 180/168 |
| 4,231,295 | 11/1980 | Förster | 180/131 |
| 4,502,558 | 3/1985 | Mauri | 180/65.2 |
| 4,588,041 | 5/1986 | Tsuchihashi | 180/168 |
| 4,630,216 | 12/1986 | Tyler et al. | 104/88 |
| 4,652,004 | 3/1987 | Wirth et al. | 180/168 |
| 4,773,018 | 9/1988 | Lundström | 180/168 |

FOREIGN PATENT DOCUMENTS

| | | |
|---|---|---|
| 0135001 | 7/1984 | European Pat. Off. . |
| 2738537 | 3/1979 | Fed. Rep. of Germany . |
| 8514260 | 5/1985 | Fed. Rep. of Germany . |

Primary Examiner—Charles A. Marmor
Assistant Examiner—Michael Mar
Attorney, Agent, or Firm—Francis J. Mulligan, Jr.; Edward A. Steen

[57] ABSTRACT

An underground unmanned, trackless mine haulage vehicle and a system for guiding such a vehicle which includes a roof mounted guide rail, physical means to detect and calculate in real time variation in angle and distance of the center line of the vehicle from the ideal path of the guide rail and means on board the vehicle to provide and carry out steering commands to correct the position of the vehicle vis-a-vis the guide rail.

12 Claims, 4 Drawing Sheets

AUTOMATED UNDERGROUND HAULAGE TRUCK

This is a continuation of copending application Ser. No. 07/189,040 filed May 2, 1988, now abandoned.

The present invention is concerned with an automated system for haulage by vehicle especially adapted to be used underground.

BACKGROUND

There is a need for greater efficiency in haulage of fractured ore (muck) in underground installations. Often it is required that large quantities of muck be transported from a pile of broken ore body to a crusher site under or above ground along a route or for such a limited time which precludes the use of conveyor belts. Ideally, a transporter vehicle for this purpose should be unmanned, capable of traversing relatively narrow drifts and curves of practical radii and be non-polluting to a mine environment. The present invention is directed to a haulage system which satisfies these requirements and, more particularly, to a practical system for guiding a steerable, self-propelled vehicle along a non-tracked route.

DRAWINGS

DESCRIPTION OF THE INVENTION

Figure 1:
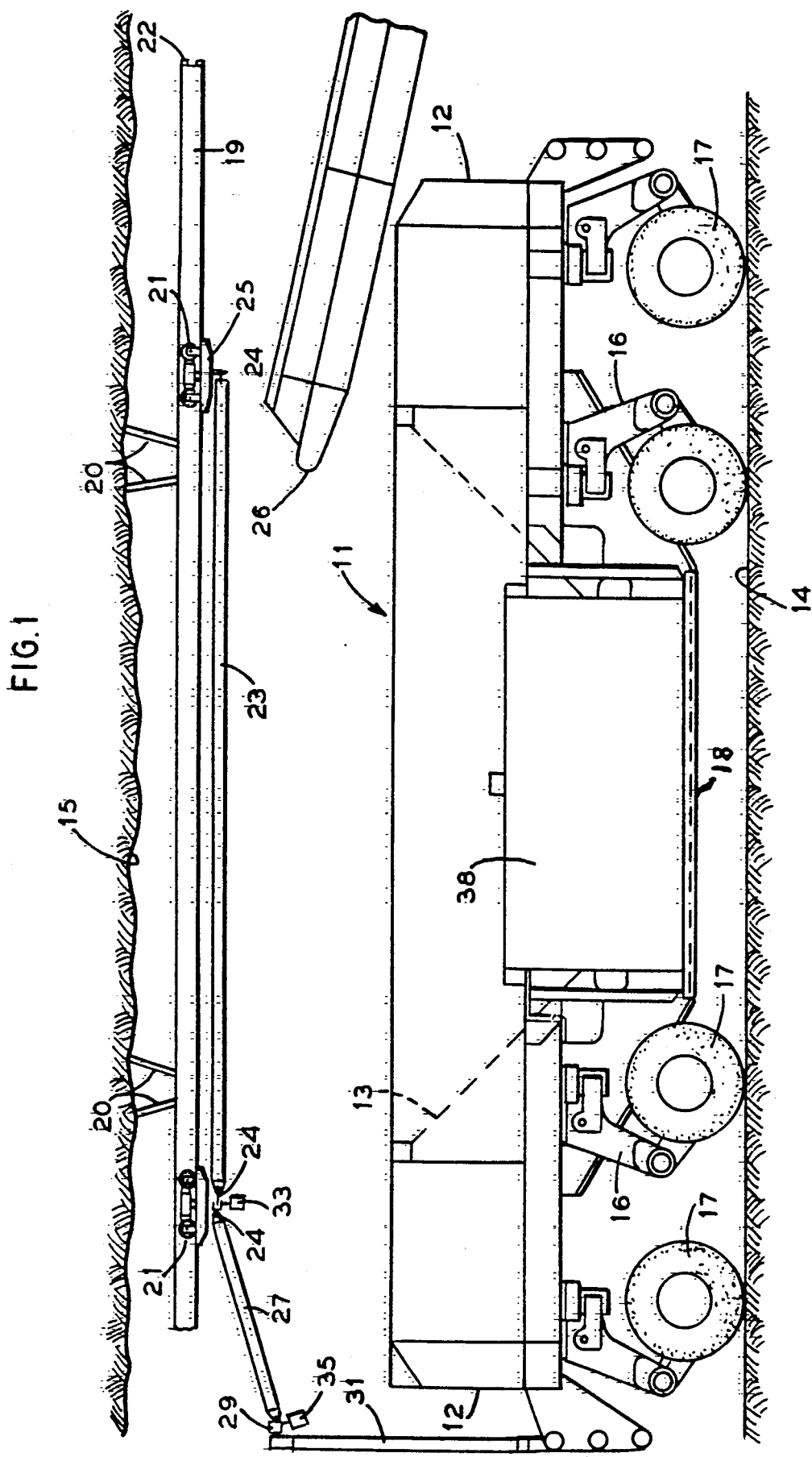
FIG. 1 is a view in elevation of the externals of a haulage vehicle used in the system of the present invention.

In general, the present invention contemplates a transportation system which includes a wayside controller containing a model assemblage of route segments including switching segments and a physical route conforming to said model assemblage of route segments. A substantially continuous elongated guide means is positioned along the physical route in fixed relation to the ideal path of at least one steerable self-propelled vehicle adapted to travel the route. Most advantageously this guide means is positioned above the route of the vehicle generally defining the center line of the route to be travelled by the vehicle.

At least a duality of output supplying sensing means are provided with respect to the self-propelled vehicle to simultaneously sense the relative positions and directions of a longitudinal reference line (e.g. the longitudinal center line) on the vehicle and the guide means at fixedly spaced apart, movable positions along the length of said guide means. These output sensing means can be mechanical, optical, magnetic, ultrasonic or other sensing means. In the case of an advantageous specific embodiment, these sensing means comprise electrical angle sensing devices measuring angles between two sections of an articulated trolley. Means are provided advantageously on board the vehicle, to compute vehicle positional and directional errors from the output of the sensing means and to actuate steering corrections in response thereto.

Further means are provided to link the vehicle and the wayside controller which are adapted to convey starting, stopping, acceleration and status signals between the wayside controller and the vehicle. In the preferred case of an electric vehicle, this further means advantageously is a radio frequency or other communication system adapted to be carried by the power cables. Processing means are provided on board the vehicle to start, stop and accelerate the vehicle in response to signals from the wayside controller and to inform the controller as to vehicle position and status.

Means are provided at the wayside controller to display position and status of the vehicle; to initiate command and override signals to the at least one vehicle; and to fix the orientation of switching segments on the vehicle route.

More particularly, the invention contemplates a system for guiding a steerable, self-propelled vehicle along a non-tracked route which includes a substantially continuous, elongated guide means (e.g. a guide rail) fixed along said route in a substantially constant relationship to the ideal path of the vehicle.

At least two detection means are mounted on said vehicle to detect the relative position and direction of a longitudinal reference line (e.g. the longitudinal center line) on said vehicle and a straight line between two fixedly spaced apart points movable on said guide means. The two fixedly spaced apart points are positioned to be essentially symmetrical to the center point of said reference line when said vehicle is in proper position with respect to the guide means.

Means responsive to the output of the detection means are provided to compute or determine any directional and lateral positional error of said vehicle with respect to the guide means and to select a preprogrammed sequence or compute a sequence of steering maneuvers to correct any error.

Steering means adapted to carry out the preprogrammed or computed sequence of steering maneuvers are provided on board the vehicle.

DESCRIPTION OF PREFERRED EMBODIMENT

Referring now to the drawings, FIG. 1 depicts, in elevation, electro-hydraulically driven mine haulage vehicle 11 having substantially identical traction ends 12 and V-shaped ore box 13. Mine vehicle 11 is depicted in its haulage configuration standing on floor 14 of a tunnel under mine roof 15. Vehicle 11 is supported on eight bogies 16, each bogie having two wheels 17. Bogies 16 are hydraulically adjustable so as to lower vehicle 11 from the haulage mode depicted in FIG. 1 to allow the bottom 18 of ore box 13 to rest on or close to floor 14 during loading and unloading. The conveyor end 26 of a continuous loader as described in Canadian Patent No. 1,191,487 is shown in FIG. 1 to illustrate a means whereby vehicle 11 can be loaded with ore.

Guide rail 19 is depicted in FIG. 1 suspended from mine roof 15 by means of hangers 20 and is fitted with end stop 22. Those of skill will appreciate that guide rail 19 extends along any and all paths along which vehicle must operate and includes curves, switches, etc. Advantageously guide rail 19 is an I-beam as shown in cross section in FIG. 4 and carries a conventional 575 volt, three phase, 60 Hertz power rail from which power for electric motors on board vehicle 11 is derived. As shown in FIG. 1 guide rail 19 supports trolley carriages 21 fixedly spaced apart by spreader bar 23 which is connected on each end by a universal joint 24 to a mounting unit 25 riding below and fixed to one of carriages 21. For practical purposes trolley carriages 21 are generally spaced apart by a distance at least equal to about 50% of the length of vehicle 11. One of carriages 21 shown on the left hand side of FIG. 1 is connected by universal joint 24 to one end of drawbar 27. The other end of drawbar 27 is connected by a further universal joint 29 to mast 31 mounted vertically and centrally on the left end of vehicle 11. By this arrangement carriages 21 are free to move on guide rail 19 as vehicle 11 moves. The total trolley-vehicle system is effective so long as the center line of the left end of vehicle 11 does not vary laterally from the path defined by guide rail 19 by more than about 80% of the length of drawbar 27. In mine haulage where drift tunnels are of minimal dimensions, see for example FIG. 4, a drawbar of about 1.8 meters provides satisfactory performance for a vehicle about 3.15 meters wide.

Figure 2:
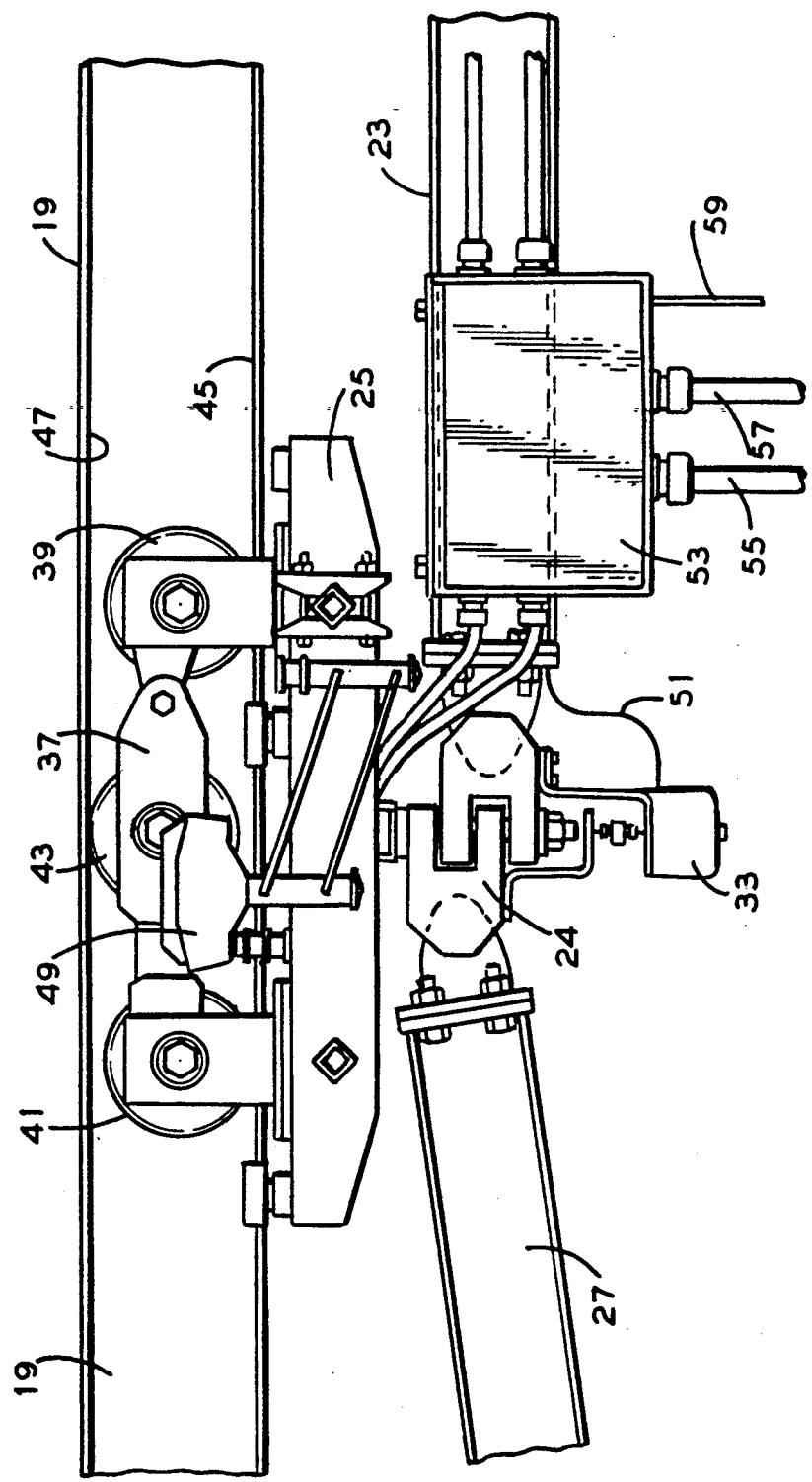
FIG. 2 is a view in elevation of a trolley carriage assembly used in the present invention.

The guidance system for vehicle 11 which causes it to follow the extended path of guide rail 19 includes angle sensor 33 and angle sensor 35. These angle sensors are advantageously differential electrical capacitors which produce a voltage output proportional to the angle measured. FIG. 2 shows details of the left hand trolley carriage 21 of FIG. 1. Trolley carriage 21 comprises frame member 37 duplicated on the viewed and reversed side of guide rail 19 supporting in bearings three carriage wheels 39, 41 and 43 for each side of guide rail 19. Carriage wheels 39 and 41 ride on bottom flange 45 of guide rail 19 and wheel 43 abuts upper flange 47 of guide rail 19. Mounting unit 25 supports frame members 37 as well as power pickup 49. Depending from mounting unit 25 is double universal joint 24 attached on one side to spreader bar 23 and on the other side to drawbar 27. Differential capacitor angle sensor 33 measures and gives indication of the angle between spreader bar 23 and drawbar 27. An electrical signal analogous to this angle is carried by wire 51 to terminal box 53. Cables 55 and 57 exiting terminal box 53 carry power to vehicle 11 and line 59 likewise carries signals from sensor 33 to vehicle 11. In like manner, sensor 35 is electrically connected to vehicle 11 to provide to equipment preferably on board vehicle 11 a signal indicative of the angle between drawbar 27 and the longitudinal center line of vehicle 11. FIG. 1 shows trolley carriages 21 at points symmetrical to the transverse vertical center plane of vehicle 11. When vehicle 11 is properly tracking a straight segment of guide rail 19, trolley carriages 21 should be in the position indicated in FIG. 1 with respect to vehicle 11 with the longitudinal center line of vehicle 11 directly beneath trolley carriages 21.

Figure 3:
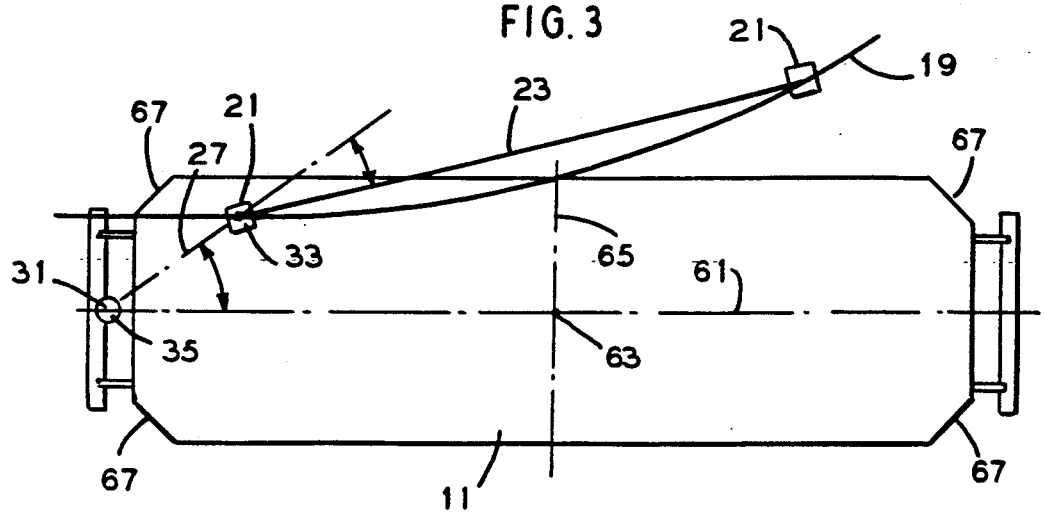
FIG. 3 is a plan view (not to scale) of a haulage vehicle as in FIG. 1 showing interrelation of the vehicle with a guide rail.

A schematic plan view of vehicle 11 laterally displaced from the curving path of guide rail 19 is depicted in FIG. 3. Referring now thereto, the longitudinal center line (or plane) 61 of vehicle 11 is parallel to but laterally displaced from the straight section of guide rail 19 on the left of FIG. 3 and at an angle to the instantaneous position of spreader bar 23 chording the curve of guide rail 19. The center point (or line) 63 of vehicle 11 marked by the intersection of longitudinal center line (or plane) 61 and transverse center line (or plane) 65 is displaced from spreader bar 23 by a perpendicular distance designated $D_{err}$. The angular discrepancy between the lay of spreader bar 23 and longitudinal center line 61 of vehicle 11 is designated $\theta_{err}$. Sensors 33 and 35 provide indicia of two angles $\beta$ and $\gamma$ which information together with knowledge of one-half the length of vehicle 11 and the effective plan length of drawbar 27 enables a calculation of $D_{err}$ and $\theta_{err}$ by means of the following equations:

$$\theta_{err} = \gamma + \beta$$

$$D_{err} = -EDBL \sin \gamma + \frac{VL}{2} \sin \theta_{err}$$

where
EDBL = effective drawbar length and
VL = vehicle length

The term "effective drawbar length" means the plan length spanned by a drawbar of given length. From the drawing in FIG. 1, those of skill in the art will recognize that with the approximate dimensions shown in that figure effective drawbar length is perhaps 3% or so less than the physical length of drawbar 27. For this depicted situation and for clearances between the top of mast 31 and guide rail 19 less than shown or slightly greater than that shown, the physical length of drawbar 27 (DBL) can be used for calculation purposes. If, however, the clearance between top of mast 31 and guide rail 19 approaches or exceeds one-half the physical length of drawbar 27, then an additional angular sensor either orthogonal to sensor 33 or sensor 35 is required to sense the slope ($\gamma$) of drawbar 27. Effective drawbar length is then calculable as:

$EDBL = \cos \gamma$ DBL (if the additional sensor is orthogonal to sensor 33) or $EDBL = \sin \gamma$ DBL (if the additional sensor is orthogonal to sensor 35).

Once $\theta_{err}$ and $D_{err}$ are determined in real time (e.g. periodically every 10 to 100 milliseconds [mSec] or so) by means of a conventional data processing unit preferably on board vehicle 11, corrective measures, if any are needed, are determined based upon the magnitude of the respective angular and distance errors and the mode of steering employed by vehicle 11.

As depicted in FIG. 1, except for mast 31 (and any necessary mast supporting devices) vehicle 11 is symmetrical left to right. One specific embodiment of vehicle 11 is designed to be steered symmetrically around a turning center which is an imaginary vertical axis on the transverse center plane 65 of vehicle 11 offset from vehicle 11 by a distance describable as the inside turning radius. For a generally rectangular mine haulage vehicle roughly 11 meters in length and 3.1 meters wide, a maximum inside turning radius of at least about 7.6 meters is practical. A vehicle of these dimensions having chamfered leading and trailing corners 67 as shown in plan on FIG. 3 has a practical minimum outside turning radius of about 12 meters. The advantage of symmetrical configuration and symmetric steering arrangement is that vehicle 11 will track the same whether proceeding to the left or to the right as shown in FIG. 1.

Figure 5:
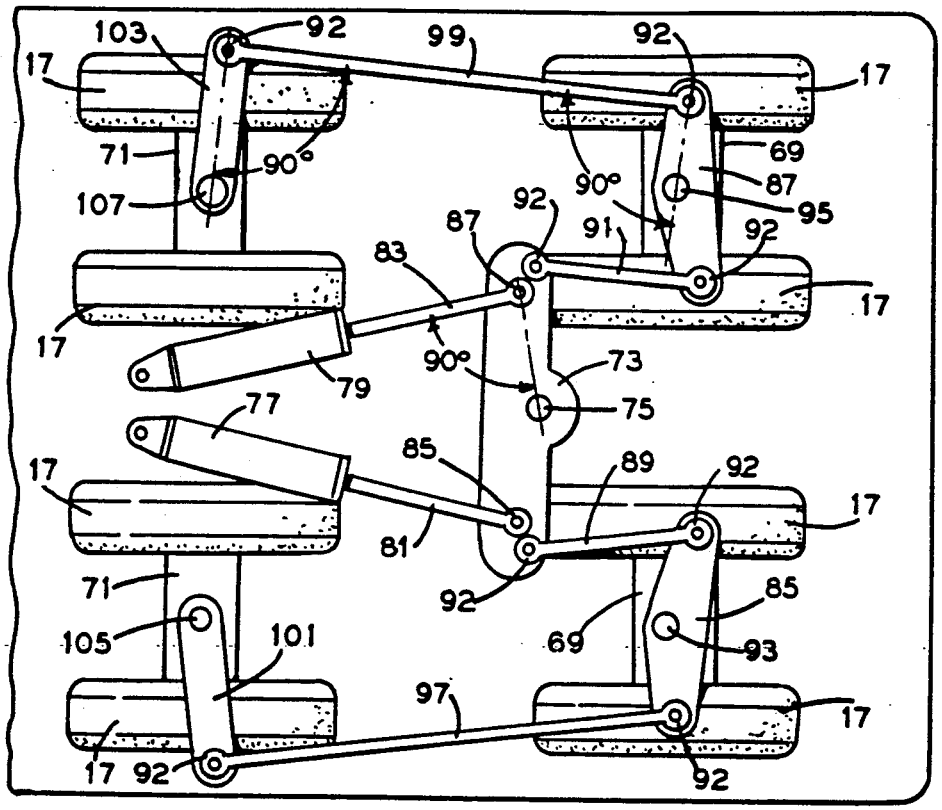
FIG. 5 is a depiction of the steering linkage on one end of the vehicle shown in FIG. 1.

A plan, schematic view of the steering mechanism of one embodiment of vehicle 11 is depicted in FIG. 5. The steering mechanism in FIG. 5 is shown for only one end of vehicle 11, the other end having a steering mechanism which is a mirror image of that depicted in FIG. 5.

Referring now thereto, wheels 17 are mounted on outboard bogies 69 and inboard bogies 71. In a particular embodiment of vehicle 11, wheels 17 on outboard bogies 69 are hydraulically driven and the wheels 17 on inboard bogies 71 are fitted with oil-immersed multi-disc brakes. The steering mechanism depicted in FIG. 5 is activated by motion of bell crank 73 pivoting about axis 75. Motion of bell crank 73 is caused by hydraulic cylinders 77 and 79 acting on rods 81 and 83 and bell crank 73 through linkages 85 and 87. Cylinders 77 and 79 are caused by means of a closed circuit hydraulic system (not shown) to act reciprocally, that is when cylinder 79 causes rod 83 to move to the right, cylinder 77 causes rod 81 to move to the left. Motion of bell crank 73 is transmitted to outboard wheel bell cranks 85 and 87 through rods 89 and 91 by means of linkages. Wheel bell cranks 85 and 87 are fixed to kingpins 93 and 95 respectively which in turn are fixed to bogies 85 and 87 respectively. Accordingly, bogies 85 and 87 turn in response to motion of bell crank 73 essentially in such fashion that extensions of the axes of wheels 17 on outboard bogies 69 will intersect on an extension of transverse plane 63 of vehicle 11. Motion of bell crank 73 is further transmitted to inboard bogies 71 by connecting rods 97 and 99 acting through linkages 92 to levers 101 and 103 respectively. Levers 101 and 103 are fixed to kingpins 105 and 107 which in turn are fixed to inboard bogies 71. By virtue of the geometry depicted in FIG. 5 and particularly the difference in length of the lever arms acting on outboard bogies 69 and inboard bogies 71, inboard bogies 71 are caused by the same impetus from bell crack 73, to turn less radically than outboard bogies 69. Thus, this arrangement provides an intersection of extensions of inboard wheel axes at approximately the same locus on the extension of the central plane of vehicle 11 at which the extensions of outboard wheel axes intersect. For all practical purposes the arrangement, as depicted in FIG. 5, together with a hydraulically linked mirror image arrangement at the opposite end of vehicle 11 allows vehicle 11 to be steered symmetrically and to track substantially identically in either forward or reverse direction.

Figure 6:
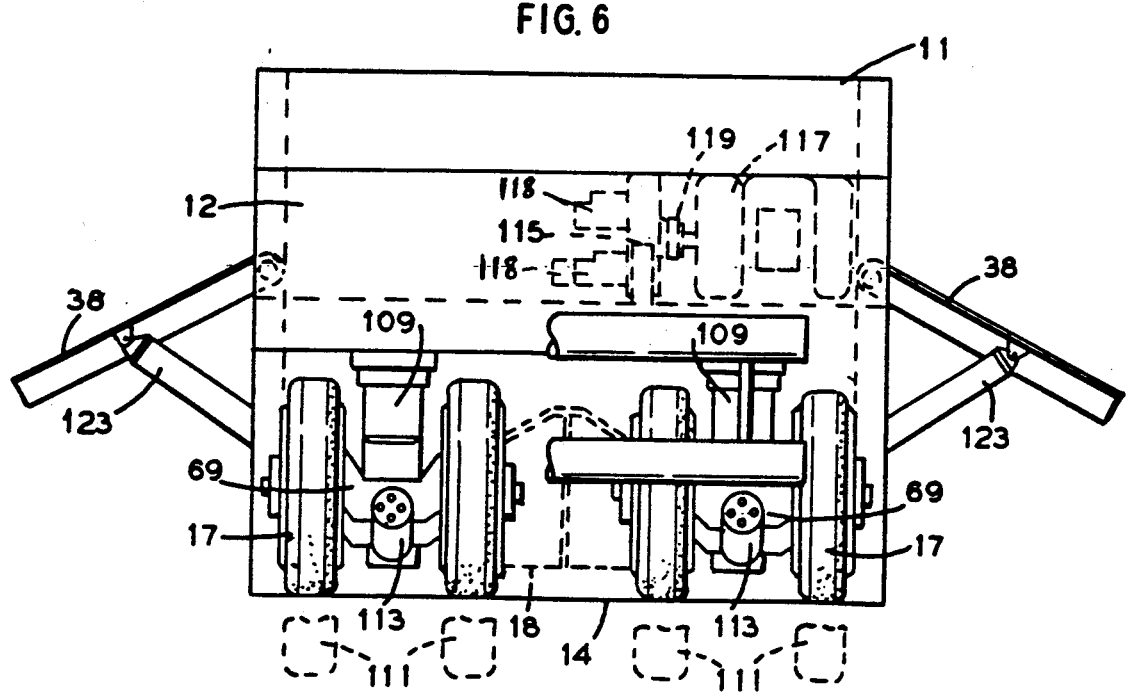
FIG. 6 is a schematic (part phantom) end view of a vehicle as in FIG. 1.

A schematic end view of vehicle 11 is depicted in FIG. 6. Outboard bogies 69 supporting wheels 17 are mounted on hydraulic suspension cylinders 109. A similar arrangement exists (but is not depicted) for inboard bogies 71. Hydraulic cylinders 109 are actuated by means of a conventional hydraulic leveling system to provide dynamic stabilization when vehicle 11 is in motion. At certain times in order to accommodate low head room, hydraulic cylinders 109 can be actuated to lower the height of vehicle 11 during travel. The normal position of wheels 17 during travel of vehicle 11 is shown in phantom as wheel positions 111. Wheels 17 are caused to rotate during travel by hydraulic motors 113. At rest, hydraulic cylinders 109 can be actuated to lower vehicle 11 such that ore box bottom 18 rests on or near the vehicle support surface, e.g. mine floor 14. This lowered position of vehicle 11 is highly advantageous for loading because it gives greater head room between the top of vehicle 11 and guide rail 19 than is depicted in FIG. 1. To complete the description of FIG. 6, there is shown in phantom within traction end 12, electric motor 117 driving hydraulic pumps 118 through coupling 119 and reduction gear 115. Also shown in the open position are doors 38 actuated by hydraulic cylinders 123 adapted to be open during unloading of vehicle 11. When loading, e.g. by a continuous loader and during transit doors 38 are closed and locked. During loading, vehicle 11 can be actuated to move forward at a slow speed, e.g. 1 kph to follow the path of a continuous loader into a muck pile. Dumping or unloading is accomplished by opening doors 38 simultaneously or in sequence.

Figure 7:
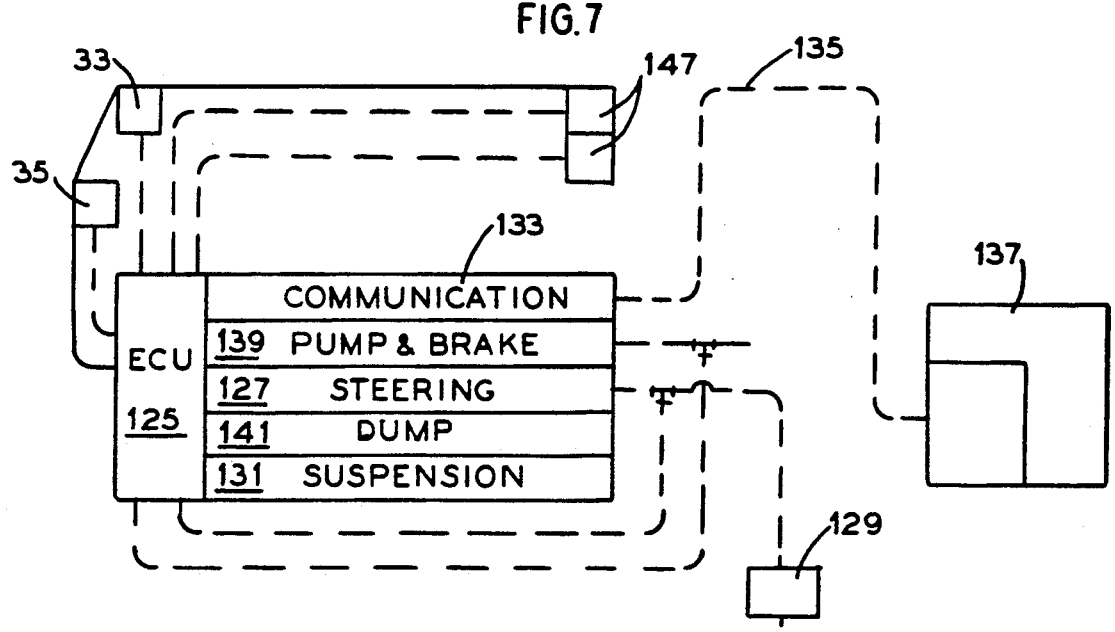
FIG. 7 is a block diagram of the control system for the vehicle guidance system of the present invention.

During travel, if vehicle 11 is on the path of guide rail 19 in which case $D_{err}=0$ and $\theta_{err}=0$. If vehicle 11 is not on the path of guide rail 19 one or both of these functions is not equal to zero. If $\theta_{err}=0$ and $D_{err}\neq 0$, this indicates pure lateral deviation from the path of guide rail 19. If $D_{err}=0$ and $\theta_{err}\neq 0$ this indicates pure directional deviation from the path of guide rail 19. If $D_{err}\neq 0$ and $\theta_{err}\neq 0$ this indicates a combination of lateral and directional error. Error detection means including trolley carriages 21, spreader bar 23, drawbar 27, angle sensor 33 and angle sensor 35 provides a real time readout of signals at a repetition rate of about 20 Hz. Thus, about every 50 mSecs signals are received on board vehicle 11 which enable computation of $D_{err}$ and $\theta_{err}$ according to the relationships set forth hereinbefore. If either or both of $D_{err}$ and $\theta err$ are not zero, the hydraulic system connected to cylinders 77 and 79 is activated to correct the error. Specifically as diagramed on FIG. 7 signals are fed from angle sensors 33 and 35 to electronic control unit 125 which in turn reacts to these signals to compute $D_{err}$ and $\theta_{err}$. From the magnitude and sign of $D_{err}$ and $\theta err$ (if any) electronic control unit 125 provides input to steering control unit 127 which develops steering command signals inputted to wheel angle controller 129. Wheel angle controller 129 comprises an electrohydraulic servo system consisting of steering cylinders 77 and 79 and conventional components including a bi-directional hydraulic valve having its spool attached to the armature of a torque motor, a cylinder rod position transducer and an electronic amplifier. During operation, an electrical input signal corresponding to the required wheel angles is compared with the signal obtained from the cylinder rod position transducer. The difference between signals is amplified and fed to the torque motor terminals. The resulting movement of the servo valve spool causes flow of hydraulic fluid into steering cylinders 77 and 79 such as to reduce the error signal to zero. The cylinder rods are then at the correct position (stroke) to yield the commanded wheel angles.

Figure 4:
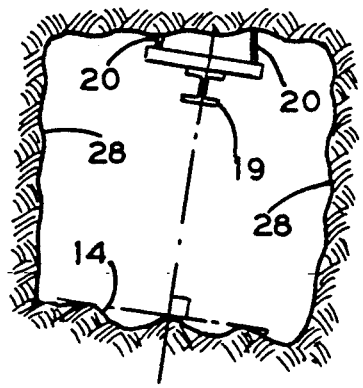
FIG. 4 is a cross sectional view of a drift showing guide rail positioning.

In providing the signal to wheel angle controller 129, two special cases should be considered. The first special case is where there is large $D_{err}$. Vehicle 11 operates within mine tunnels such as depicted in FIG. 4. Because of practical and economic factors, there is little clearance between the sides of vehicle 11 and tunnel walls 28. When a $D_{err}$ exists, generally the signal to wheel angle controller 129 is proportional to the magnitude of $D_{err}$ allowing more rapid corrections of larger errors. However, when $D_{err}$ is very large meaning that the side of vehicle 11 is very close to tunnel wall 28, the signal to wheel angle controller 129 cannot be proportional to $D_{err}$ because vehicle swing-out during corrective turning would cause a collision between vehicle 11 and tunnel wall 28. Thus, proportional guidance control must be modified for values of $D_{err}$ in excess of some significant fraction of tunnel clearance. When $D_{err}$ is in this high range, only slight directional correction can be employed until $D_{err}$ is brought into a range where proportional control is operative.

The second special case with respect to signals to wheel angle controller 129 is concerned with curves.

Geometry dictates firstly: that considering a generally rectangular vehicle 11, there is a minimum tunnel median radius of curvature below which vehicle 11 cannot negotiate the curve; and secondly the turning axis 63 of vehicle 11 must be inside the tunnel median radius of curvature to assure adequate clearance between various parts of vehicle 11 and tunnel walls 28. In the preceding sentence the term "tunnel median radius of curvature" is the radius of curvature of the center line of a curving tunnel as opposed to the radii of curvature of the inner and outer walls. Using spreader bar 23 of adequate length and assuming vehicle 11 is properly tracking curving guide rail 19 mounted in the center line of the tunnel from mine roof 15, turning axis 63 of vehicle 11 will be inside the track of guide rail 19. However, it may be advantageous to augment the distance between the path of turning axis 63 and guide rail 19 by means of an additive signal of finite value to steering cylinders 77 and 79 in order to keep wheels 17 turned as vehicle 11 negotiates the curve.

Also composited into signals from electronic control unit 125 to steering control unit 127 can be compensating signals for the effects of roll and bounce of vehicle 11 and uneven or non-level travelling surfaces such as depicted as mine floor 14 in FIG. 4. Such compensatory signals as well as positional signals can also be fed to suspension control unit 131 which controls hydraulic suspension cylinders 109 individually and collectively. Referring back to FIG. 7, the block diagram therein indicates the type of system involving on board controllers to the left of the drawing and a control station on the right of the drawing. The two are linked by communication module 133 operating through line 135, e.g. a power line and connected to a wayside computerized control and display unit 137. Signals originating at control and display unit 137 control starting, speed and stopping of vehicle 11 through pump and brake control unit 139 and control dumping through dump unit 141. Steering control unit 127 and pump and brake unit 139 are modulated through electronic control unit 125 by means of feedback lines 143 and 145. Sensors 147 of wayside markers (not depicted) provide positional information as to vehicle 11 to central control and display unit 137. Status signals of steering, dumping, starting, speed and stopping all pass from vehicle 11 via line 135 to central control and display unit 137.

Those skilled in the art will appreciate that the vehicle control system of the present invention is adapted to be included in an overall transportation system involving paths of generally more than one vehicle and inclusive of switch points, loading areas, parking zones, unloading areas, repair bays and the like. Furthermore, a complete transportation system for a mine is not a fixed system in that as mining progresses vehicle routes vary and may be changed completely to accommodate operations at various levels. Thus, when in the present description the term "control and display unit 137" is employed, it is to be understood that the vehicle guidance functions of such a unit are likely only part of the functions of an overall system control means. For example, an overall system control unit will contain a catalog of route segments which can be electronically assembled and displayed as a route model and can be changed as mining conditions warrant. An overall system control combined with communication units has the capacity to organize the route model into blocks, position switches and operate and monitor a plurality of vehicles along the route in such fashion to enable the vehicles to function independently of and in harmony with each other. Such an overall control system is to be considered an adjunct of the particular vehicle control system of the present invention.

It is to be appreciated that although the present invention is particularly described in conjunction with an electro-hydraulically powered vehicle, the guidance system described herein is equally applicable to the guidance of vehicles powered by other means. For example, vehicle 11 could be powered by an internal combustion engine, e.g. a diesel engine the output of which is conducted to wheels 17 by means of a conventional gear/axle drive train. Alternatively, such an internal combustion engine could actuate hydraulic pump 117 or an electrical generator feeding electric motors connected to drive wheels 17.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A system for guiding a steerable, self-propelled generally rectangular vehicle along a non-tracked route comprising:
   a a substantially continuous, elongated guide means fixed along said route in a substantially constant relationship to the ideal path of said vehicle, said vehicle being longitudinally symmetrical and having interlinked front and rear wheels arranged to pivot in mirror image with respect to the vertical transverse plane at body center of said vehicle on axes which, when extended, intersect on an extension of said central transverse plane of said vehicle;
   b a draw bar swivelly connected at one end to said vehicle and swivelly connected at an opposite end to one end of a spacer bar, said spacer bar having opposed ends which are connected to said guide means for movement therealong;
   c first detection means for sensing the angle between said drawbar and a longitudinal reference line of said vehicle and second detection means for sensing the angle between said spacer bar and said drawbar;
   d means responsive to the output of said at least two detection means to determine any directional and lateral positional error of said vehicle with respect to said guide means and to program sequence of steering maneuvers to correct any said error; and
   e steering means connected with said interlinked front and rear wheels adapted to carry out said programmed sequence of steering maneuvers.

2. A system as in claim 1 wherein said guide means is a guide rail fixed overhead along the center line of the route of said vehicle.

3. A system as in claim 1 wherein said guide means comprises a guide rail and said angular sensing means are mounted on an articulated trolley riding on said guide rail and connected to said vehicle; said guide rail being fixed overhead along the centerline of the route of said vehicle.

4. A system as in claim 3 wherein said articulated trolley comprises spaced apart trolley carriages connected by said spacer bar.

5. A system as in claim 1 wherein said longitudinal reference line on said vehicle is the longitudinal center line.

6. A system as in claim 1 wherein said means responsive to the output of said first and second detection means is on board said vehicle.

7. The system of claim 6 is combination with a central wayside computerized controller, communication means between said central wayside computerized controller and at least one said vehicle, means to initiate start, stop and speed control signals from said central wayside computerized controller, means on board said vehicle to receive said signals and carry out said functions and means on board said at least one vehicle to input said central wayside controller as to the status and position of said at least one vehicle.

8. A system as in claim 7 wherein said computerized wayside controller models and displays the route system for said at least one vehicle and outputs signals to control the position of switches along said route system.

9. A system as in claim 8 wherein said model and display of said route system is composed of route system segments stored in said computerized wayside controller and is adapted to be changed as the modeled physical route changes.

10. A system as in claim 1 wherein said vehicle is electrohydraulically operated.

11. A system as in claim 10 wherein the electric power to operate said vehicle is taken from a power track associated with said guide means.

12. A system as in claim 11 wherein said electrohydraulically operated vehicle is a mine haulage vehicle, said guide means is a guide rail fixed to the roof of a mine along the center line of the route of said mine haulage vehicle, said system includes an articulated trolley riding on said guide rail and connected to said vehicle and power from said power track is conducted to said vehicle by means associated with said trolley.

* * * * *